United States Patent
Bowell et al.

[19]

[11] Patent Number: 6,079,361

[45] Date of Patent: Jun. 27, 2000

[54] ANIMAL WATERING SYSTEM & METHODS

[75] Inventors: J. David Bowell, Vadnais Heights; George R. Peterson, Brooklyn Park, both of Minn.

[73] Assignee: Miller Manufacturing Company, Eagan, Minn.

[21] Appl. No.: 09/133,478

[22] Filed: Aug. 13, 1998

Related U.S. Application Data

[63] Continuation-in-part of application No. 29/079,052, Nov. 7, 1997, Pat. No. Des. 403,131.

[51] Int. Cl.[7] ...................................................... A01K 5/02
[52] U.S. Cl. ................................ 119/72; 119/52.1; 119/74
[58] Field of Search ................................ 119/72, 61, 51.5, 119/74, 52.1, 53; D30/121, 132, 133, 129, 130, 131; D7/300, 602, 619, 620; 222/160, 166

[56] References Cited

U.S. PATENT DOCUMENTS

| | | |
|---|---|---|
| D. 4,542 | 12/1870 | Van Gaasbeek . |
| D. 35,532 | 12/1901 | Fisk . |
| D. 42,061 | 12/1911 | Quebe . |
| D. 218,831 | 9/1970 | Leeming . |
| D. 233,642 | 11/1974 | Arnold . |
| D. 233,895 | 12/1974 | Mineo . |
| D. 234,144 | 1/1975 | Fassauer . |
| D. 250,422 | 11/1978 | Mallinson . |
| D. 316,382 | 4/1991 | Lorenzana et al. ................ D11/164 |
| 331,097 | 11/1885 | Strong . |
| D. 352,575 | 11/1994 | Bransky et al. . |
| D. 364,942 | 12/1995 | VanSkiver et al. ................ D30/121 |
| D. 374,516 | 10/1996 | Lillelund et al. .................. D30/132 |
| D. 374,952 | 10/1996 | Wenstrand ......................... D30/132 |
| D. 393,108 | 3/1998 | Atchley .............................. D30/121 |
| D. 403,131 | 12/1998 | Bowell et al. ..................... D30/132 |
| D. 406,926 | 3/1999 | Kolozsvari ......................... D30/132 |
| 732,655 | 6/1903 | Saunders . |
| 854,615 | 5/1907 | Vorheis et al. . |
| 903,041 | 11/1908 | Yerian et al. . |
| 1,571,409 | 2/1926 | Hayes . |
| 1,801,932 | 4/1931 | Miller . |
| 1,838,324 | 12/1931 | Olson . |
| 1,863,410 | 6/1932 | Morin . |
| 2,086,341 | 7/1937 | Tolley . |
| 2,148,180 | 2/1939 | Teigen . |
| 2,324,020 | 7/1943 | Pinson . |
| 2,513,200 | 6/1950 | Pax . |
| 2,540,758 | 2/1951 | Rinnman . |
| 2,562,165 | 7/1951 | Baringer . |
| 2,623,500 | 12/1952 | Riley et al. . |
| 2,653,570 | 9/1953 | Gromdstaff . |

(List continued on next page.)

FOREIGN PATENT DOCUMENTS 600335    2/1926    France .

OTHER PUBLICATIONS

Little Giant® Farm, Ranch and Pet Products brochure, Miller Manufacturing Company, South St. Paul, MN, Mar. 1996; 16 pages.

Brower® price list, © 1995, Brower, Houghton, IA; 2 pages.

*Primary Examiner*—Peter M. Poon
*Assistant Examiner*—Yvonne R. Abbott
*Attorney, Agent, or Firm*—Merchant & Gould P.C.

[57] ABSTRACT

An animal watering system includes a storage device, that has a bottom, a top, a mouth located within the top, and a plurality of sides, and a drinking device that is designed to dispense a liquid and to receive the bottom of the storage device. The storage device includes a selectively openable and closable port system and a sealing mechanism for sealing the mouth of the storage device. A method of using an animal watering system is also provided. The method includes the steps of placing a first cap on an orifice in the storage device, filling the storage device with a liquid through a top of the storage device, sealing the top of the storage device, placing the storage device within the drinking device, and removing the first cap from the orifice.

24 Claims, 4 Drawing Sheets

U.S. PATENT DOCUMENTS

| | | |
|---|---|---|
| 2,687,115 | 8/1954 | Andrews . |
| 2,702,528 | 2/1955 | Lehmann . |
| 3,035,730 | 5/1962 | Walker et al. . |
| 3,147,739 | 9/1964 | Shaheen . |
| 3,730,141 | 5/1973 | Manning et al. . |
| 3,877,482 | 4/1975 | Rawdon . |
| 3,924,772 | 12/1975 | Magnani . |
| 4,050,415 | 9/1977 | Conger ................................. 119/51.5 |
| 4,473,031 | 9/1984 | Bobeczko ............................ 119/51.12 |
| 4,527,513 | 7/1985 | Hart et al. . |
| 4,591,050 | 5/1986 | Finke et al. . |
| 4,840,143 | 6/1989 | Simon ................................... 119/52.1 |
| 4,844,273 | 7/1989 | Hawkins . |
| 4,896,782 | 1/1990 | Hawkins et al. . |
| 4,947,796 | 8/1990 | Robinette ............................. 119/51.5 |
| 5,195,463 | 3/1993 | Lorenzana et al. ...................... 119/77 |
| 5,207,182 | 5/1993 | Lorenzana . |
| 5,218,926 | 6/1993 | Wenstrand .............................. 119/77 |
| 5,498,333 | 3/1996 | Canther . |
| 5,547,275 | 8/1996 | Lillelund et al. . |
| 5,682,835 | 11/1997 | Walter et al. . |
| 5,799,609 | 9/1998 | Burns et al. ............................ 119/74 |
| 5,809,934 | 9/1998 | Gavet ................................... 119/52.1 |
| 5,829,386 | 11/1998 | Wenstrand . |
| 5,842,437 | 12/1998 | Burns ..................................... 119/74 |
| 5,845,600 | 12/1998 | Mendes ................................. 119/51.5 |

ANIMAL WATERING SYSTEM & METHODS

CROSS REFERENCE TO RELATED APPLICATIONS

This patent application is a continuation-in-part application of U.S. Design patent application Ser. No. 29/079,052, filed on Nov. 7, 1997, now U.S. Pat. No. Design D403131 hereby incorporated by reference.

FIELD OF THE INVENTION

The present invention generally relates to animal watering systems and, in particular, to an apparatus for continuously supplying water to an animal drinking receptacle.

BACKGROUND

Animal watering systems are popular for a wide variety of uses. Animal watering systems are convenient because they provide storage for relatively large amounts of water and disperse the water to the animals as the water level in the drinking receptacle decreases. In this manner, animal watering systems continuously supply water to animals without the need for constant refilling. Such systems are applicable to a wide variety of animals, such as poultry and domestic animals.

Concerns are often raised regarding animal watering systems. One such concern is portability. The typical animal watering system is bulky and difficult to carry. In addition, the watering systems are developed to continuously supply water and as such are not readily adaptable to be transported without first emptying the water from the watering system. Another concern is the ability to transport the water with the watering system. Some users of the animal watering systems prefer to transport water along with the animal watering system. Typical animal watering systems must be emptied prior to transporting. Thus, in order to transport water for use with these systems, the user must carry the water in separate containers. Improvements are desirable.

SUMMARY OF THE INVENTION

In one aspect of the present invention, one example embodiment involves an animal watering system. The animal watering system includes a storage device, that has a bottom, a top, a mouth located within the top, and a plurality of sides, and a drinking device that is designed to dispense a liquid and to receive the bottom of the storage device. The storage device includes a selectively openable and closable port system and a sealing mechanism for sealing the mouth of the storage device.

In another aspect of the present invention, a method of using an animal watering system is provided. The method includes the steps of placing a first cap on an orifice in the storage device, filling the storage device with a liquid through a top of the storage device, sealing the top of the storage device, placing the storage device within the drinking device, and removing the first cap from the orifice.

The above summary of the present invention serves to exemplify principles and is not intended to describe each illustrated embodiment or every possible implementation of the principles of the present disclosure. The figures and the detailed description that follow also serve to exemplify the principles of this disclosure.

BRIEF DESCRIPTION OF THE DRAWINGS

The invention may be more completely understood in consideration of the detailed description of various embodiments of the invention that follows in connection with the accompanying drawings in which.

Figure 1:
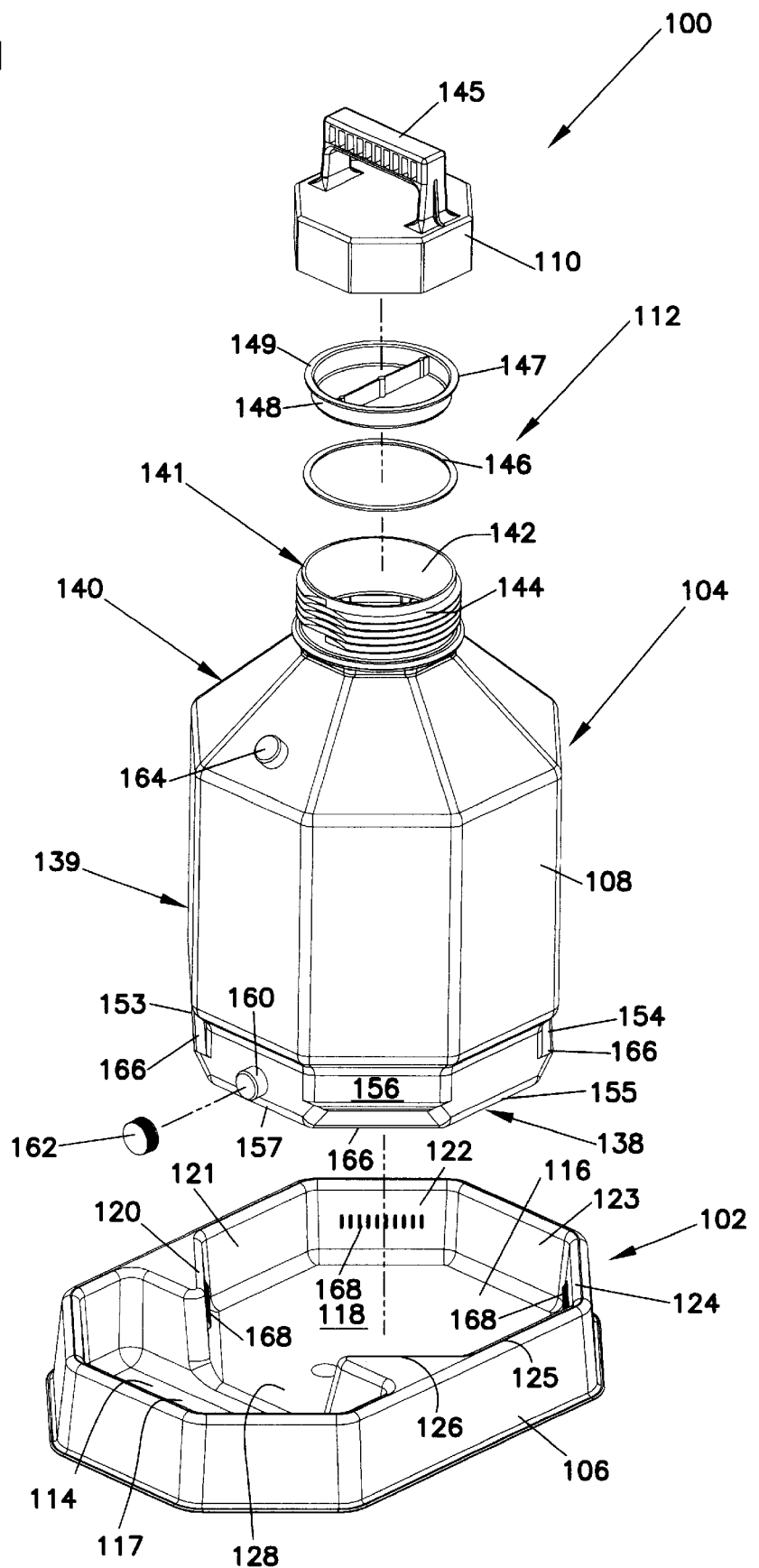
FIG. 1 is an exploded, perspective view of an unassembled animal watering system, according to an example embodiment of the present invention.

While the invention is amenable to various modifications and alternative forms, specifics thereof have been shown by way of example in the drawings and will be described in detail. It should be understood, however, that the intention is not to limit the invention to the particular embodiments described. On the contrary, the intention is to cover all modifications, equivalents, and alternatives falling within the spirit and scope of the invention.

DETAILED DESCRIPTION

The present invention is believed to be applicable to a variety of animal watering systems. The invention has been found to be particularly advantageous for transporting animal watering systems. An appreciation of various aspects of the invention is best gained through a discussion of an application example for such an animal watering system.

According to an example embodiment of the present invention, a portable animal watering system is provided. The animal watering system is convenient in that it includes a handle integral with the cap for easy portability and includes a capped orifice to eliminate water leakage during transportation.

Attention is directed to FIG. 1. FIG. 1 is a perspective view of an animal watering system 100 according to an example embodiment of the present invention. The particular one shown in the drawings is preferred because of its distinctive, eye-catching, attractive appearance. The animal watering system 100 includes a drinking device 102 and a storage device 104. Preferably, the drinking device 102 comprises a drinking receptacle 106 designed to receive and hold the storage device 104 and to dispense water from the storage device 104 to the animal. Preferably, the storage device 104 comprises a storage tank 108, a cap 110, and a sealing mechanism 112.

Generally, the drinking receptacle 106 is designed to provide a stable base for the animal watering system 100. By the term "stable," it is meant that the base is arranged and configured to hold the animal watering system 100 upright and to withstand any tipping forces that might be exerted on the animal watering system 100. In the embodiment illustrated in FIGS. 1–3, the drinking receptacle 106 has a first section 114 and a second section 116. The first section 114 is designed to dispense water to an animal, such as a domestic animal or poultry, and can be any shape desired. In the illustrated embodiment, the first section 114 has a bottom 117 and a plurality of sides forming a generally half-octagonal shape. Of course, the first section 114 can be of any size or shape suitable to its desired use.

The second section 116 is connected to and is in liquid-flow communication with the first section 114 and is designed to receive and hold the storage tank 108. By the term "liquid-flow communication," it is meant that a liquid freely flows between the first section 114 and the second section 116. In the illustrated embodiment, the second section 116 has a bottom 118 and a plurality of sides. Preferably, the second section 116 has a first side 120, a second side 121, a third side 122, a fourth side 123, a fifth side 124, a sixth side 125, and a seventh side 126, as shown in FIG. 1. In addition, the first and second sections 114, 116 define a gap 128 between the first and second sections 114, 116. The gap 128 allows a liquid, typically water, to freely flow between the first and second sections 114, 116. Preferably, the second section 116 has an octagonal shape as defined by the seven sides 120, 121, 122, 123, 124, 125, 126 and the gap 128. Of course, the second section 116 could also be any size or shape.

The drinking receptacle 106 can be constructed from one of a variety of materials. For example, the drinking receptacle 106 can be constructed from a metal or plastic.

Figure 2:
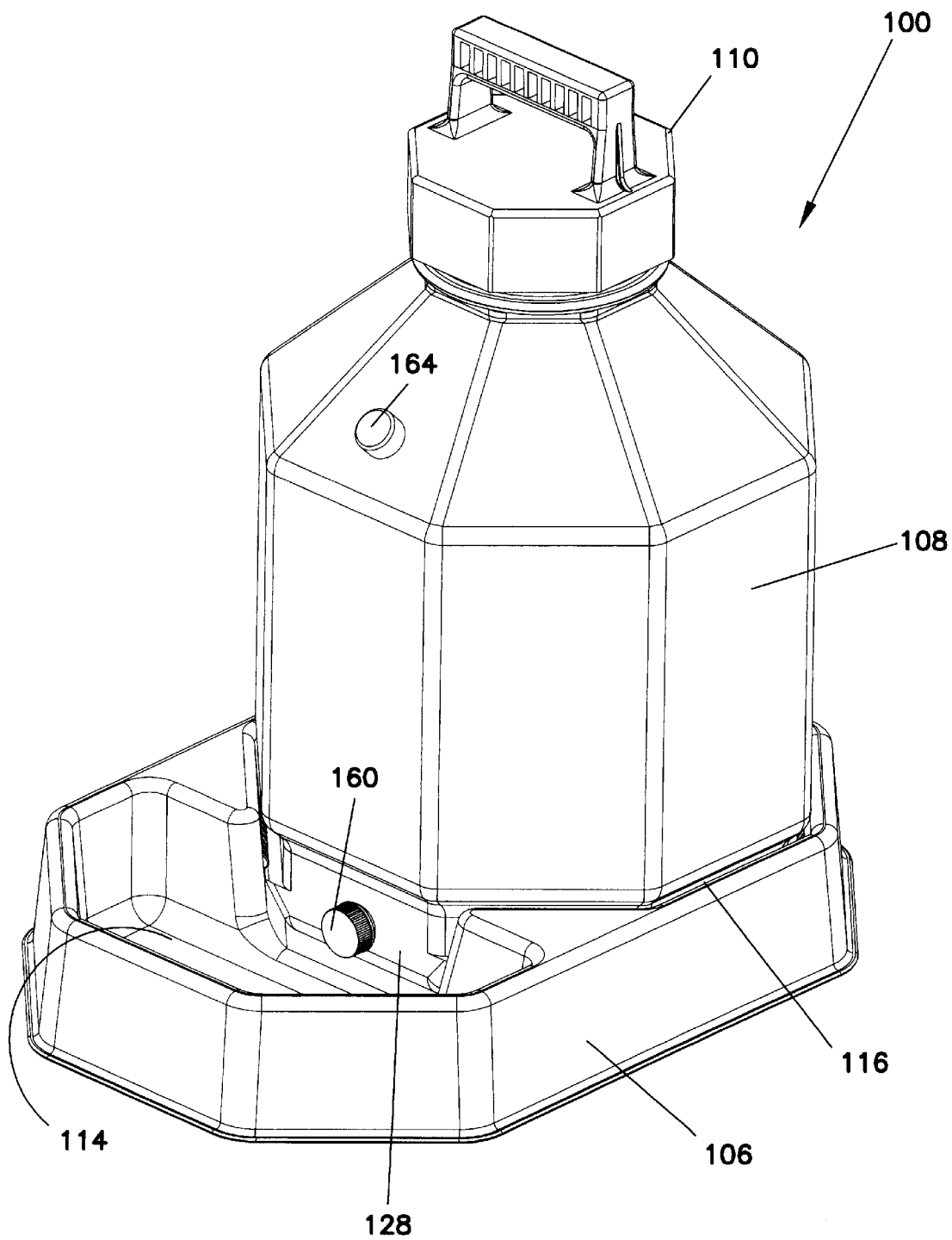
FIG. 2 is a perspective view of the animal watering system of FIG. 1 in assembled form, according to an example embodiment of the present invention.
Figure 3:
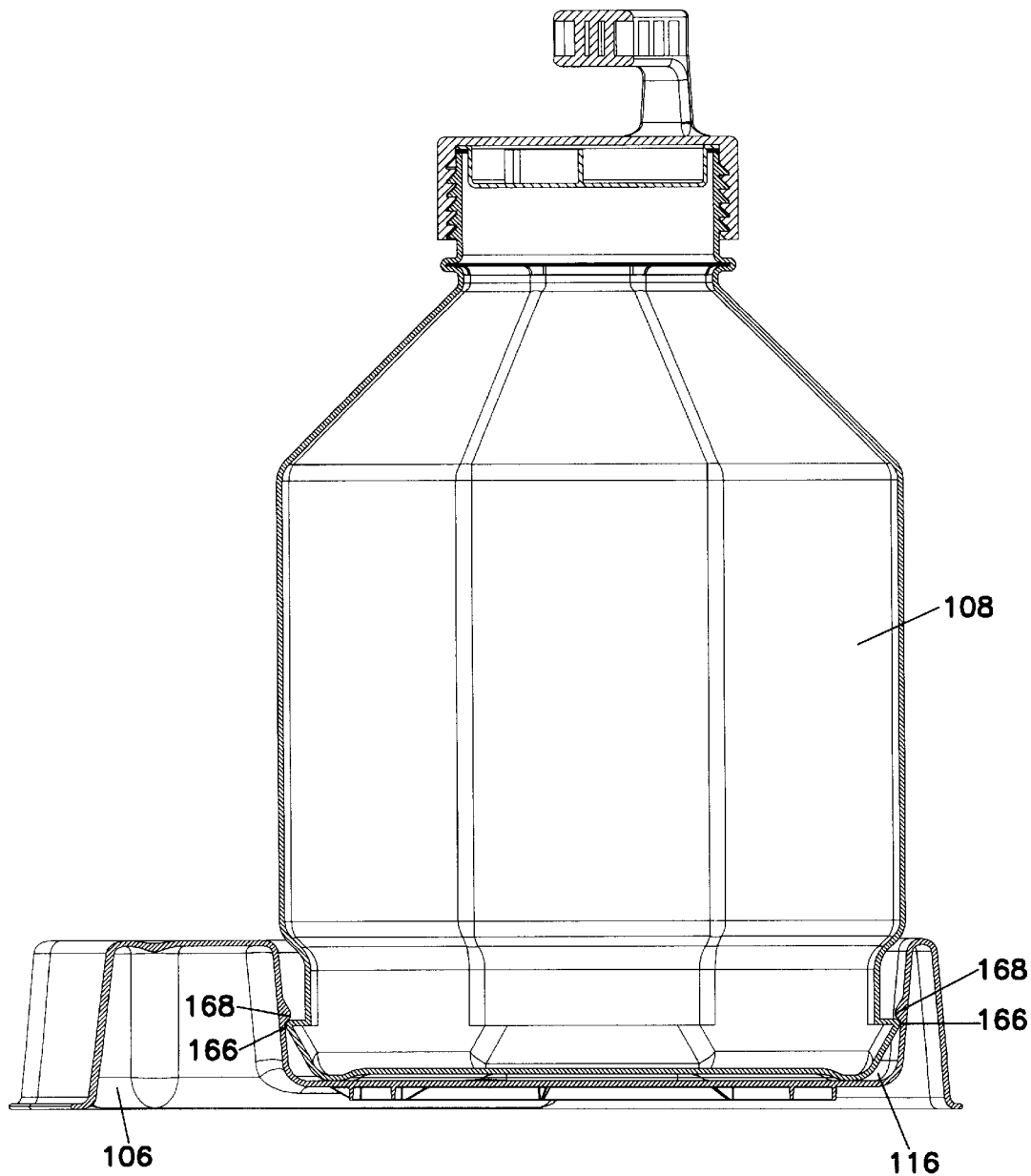
FIG. 3 is a cross-sectional view of the assembled animal watering system of FIG. 2, according to an example embodiment of the present invention.

In the embodiment illustrated in FIGS. 1–3, the storage tank 108 has a bottom section 138, a first midsection 139, a second midsection 140, and a top 141. The storage tank 108 can be of any size or shape dictated by the desired use of the animal watering system 100. Preferably, the storage tank 108 holds between 3 gallons (11.4 liters) and 7 gallons (26.5 liters) of a liquid, usually water, and typically holds 5 gallons (18.9 liters).

The first and second midsections 139, 140 of the storage tank 108 have a plurality of sides that form a generally octagonal shape. The second midsection 140 has a plurality of sides that are angled inward toward the top 141 of the storage tank 108. By the term "angled inward," it is meant that the plurality of sides form a transition area from the larger first midsection 139 to the smaller top 141. A mouth 142 provides access to the interior of the storage tank 108 through the top 141 of the tank 108. The top 141 of the storage tank 108 is generally circular or round and has integral male threads 144 around the outside circumference of the top 141.

The storage tank 108 can be constructed from one of a variety of materials. For example, the storage tank 108 can be constructed from a metal or a plastic, such as a transparent polyethylene. The transparent polyethylene would allow the user to see how much water is remaining in the storage tank 108 at any given time.

The cap 110 has integral female threads around the inside circumference of the cap 110. The cap 110 is designed such that the female threads of the cap 110 engage with the male threads 144 of the top 141 of the storage tank 108, forming an openable and closable top 141 of the tank 108. The cap 110 is screwed onto the top 141 of the storage tank 108 to close the top 141 of the tank 108 and to prevent access to the interior of the tank 108 through the mouth 142. The cap 110 also has an integral handle 145. The handle 145 facilitates opening and closing the cap 110 by providing a place for the user to grasp the cap 110 to screw or unscrew the cap 110 from the storage tank 108. In addition, when the cap 110 is screwed onto the storage tank 108, the handle 145 provides a place for the user to grasp and pick-up the tank 108 or the entire animal watering system 100, facilitating transportation of the tank 108 and the animal watering system 100. The cap 110 can be constructed of one of a variety of materials, such as a metal or plastic.

The top 141 of the storage tank 108 and the cap 110 can be of any size or shape. Preferably, the top 141 is circular or round and has a diameter between 5 inches (127 mm) and 6 inches (152.4 mm) and typically has a diameter of 5.34 inches (135.6 mm). The cap 110 is slightly larger than the top 141, enabling the cap 110 to fit over and screw onto the top 141.

Alternatively, the top 141 and the cap 110 do not have integral male and female threads. Any method of attaching a cap 110 to a top 141 may be utilized. For example, the cap 110 and the top 141 could have a circular or round shape, with both having approximately the same diameter. This would create a tight-fit between the cap 110 and the top 141 when the cap 110 is slid over the top 141. By the term "tight-fit," it is meant that the cap 110 is held in place over the top 141 of the storage tank 141 by friction.

The sealing mechanism 112 creates an air-tight seal between the cap 110 and the top 141 of the storage tank 108. By the term "air-tight," it is meant that air cannot enter or leave the storage tank 108 through the mouth 142 of the tank 108. In the embodiment illustrated, the sealing mechanism 112 includes a first ring 146 and a second ring 147. Preferably, the first ring 146 comprises a pliable material, such as rubber, and the second ring comprises a less pliable or harder material, such as plastic. The first ring 146 has a diameter approximately equal to the diameter of the top 141 of the storage tank 108. The second ring 147 has an inner lip 148, with a slightly smaller diameter than the first ring 146, that fits within the first ring 146 and the top 141 of the storage tank 108. The second ring 147 also has an upper lip 149, with approximately the same outside diameter as the first ring 146, that fits on top of the first ring 146.

The first ring 146 is placed on the top 141 of the storage tank 108. The second ring 147 is placed over and inside the first ring 146. The cap 110 is placed over the second ring 147 and is screwed onto the male threads 144 of the top 141 of the storage tank 108. When the cap 110 is screwed tightly onto the top 141 of the storage tank 108, the first ring 146 is compressed between the second ring 147 and the top 141 of the tank 108, creating an air-tight seal between the cap 110 and the top 141 of the tank 108.

The second ring 147 is designed to increase the useful life of the first ring 146. Screwing the cap 110 onto the top 141 of the storage tank 108 applies frictional forces to the component that comes in contact with the cap 110. In the embodiment illustrated, the second ring 147 is in contact with the cap 110 and absorbs the frictional forces created by the screwing of the cap 110 onto the top 141 of the storage tank 108. The second ring 147 pushes downward on the first ring 146 creating the air-tight seal. Thus, the second ring 147, constructed from a less pliable or harder material, protects the first ring 146, constructed from a more pliable material, from the frictional forces of screwing and thus increases the useful life of the first ring 146.

Alternatively, the sealing mechanism 112 could be constructed of any components or materials that would create an air-tight seal.

The bottom section 138 of the storage tank 108 also has a plurality of sides. Preferably, the bottom 138 of the storage tank 108 is octagonal in shape and has a first side 153, a second side (not shown), a third side (not shown), a fourth side (not shown), a fifth side 154, a sixth side 155, a seventh side 156, and an eighth side 157. The eighth side 157 preferably includes a system for permitting the selective flow of liquid between the liquid volume or reservoir in the storage tank 108 and the open volume of the drinking receptacle 106. While a variety of systems are contemplated, the embodiment herein includes an independent selectively openable and closable port system. By "independent," it is meant that the port system operates as a stand-alone system and not in conjunction with another component of the animal watering system 100. In the port system illustrated in FIG. 1, the eighth side 157 has an aperture, port, or orifice 160 located at the bottom of the storage tank 108. The orifice 160 can be of any size desired. Preferably, the orifice 160 has a diameter between 3/8 inches (9.5 mm) and 5/8 inches (15.9 mm) and typically is 1/2" (12.7 mm). The orifice 160 allows a liquid, typically water, to flow out of the storage tank 108. The orifice 160 has integral male threads around the outside circumference of the orifice 160.

The port system is preferably selectively openable and closable by way of a plug or cover arrangement. In the embodiment illustrated, the cover arrangement includes an orifice cap 162. Preferably, the orifice cap 162 has integral female threads around the inside circumference of the orifice cap 162. The orifice cap 162 is designed such that the female threads of the orifice cap 162 engage with the male threads of the orifice 160, forming an openable and closable orifice 160. The orifice cap 162 is screwed onto the orifice 160 to prevent the liquid within the storage tank 108 from flowing out of the tank 108. A gasket (not shown) can be used to help seal the orifice 160 and to prevent any liquid from leaking out.

The storage tank 108 preferably includes a storage mechanism for the cover arrangement of the port system. In the embodiment illustrated in FIG. 1, the storage mechanism includes a stub 164. Preferably, the stub 164 is provided on the second midsection 140 of the storage tank 108 and is closed with integral male threads around the outside circumference of the stub 164. By the term "closed," it is meant that the stub 164 does not provide access to the interior of the storage tank 108. The stub 164 provides a convenient storage place for the orifice cap 162 when not in use to close the orifice 160; the orifice cap 162 is screwed onto the stub 164 for storage.

Alternatively, the orifice 160 and the orifice cap 162 do not have integral male and female threads. Any method of attaching an orifice cap 162 to an orifice 160 may be utilized. For example, the orifice cap 162 and the orifice 160 could have a round shape, with both having approximately the same diameter. This would create a tight-fit between the orifice cap 162 and the orifice 160 when the orifice cap 162 is slid over the orifice 160. By the term "tight-fit," it is meant that the orifice cap 162 is held in place over the orifice 160 by friction.

The orifice 160, orifice cap 162, and the stub 164 can be constructed of any material desired, for example, a metal or plastic.

Attention is directed to FIG. 2. The drinking receptacle 106 is designed to receive the storage tank 108. The octagonal shape of the storage tank 108 fits within and is received by the octagonal shape of the second section 116 of the drinking receptacle 106. The storage tank 108 and the drinking receptacle 106 include a system for securing the storage tank 108 within the drinking receptacle 106. While a variety of systems are contemplated, the embodiment herein includes a selectively interlocking system. In the one illustrated in FIG. 1, the first side 153, third side (not shown), fifth side 154, and the seventh side 156 of the bottom 138 of the storage tank 108 have lips, generally represented as 166, extending therefrom. The first side 120, third side 122, fifth side 124, and the seventh side 126 of the second section 116 of the drinking receptacle 106 have corresponding ridges, generally represented as 168, extending therefrom.

Attention is directed to FIG. 3. The lips 166 of the storage tank 108 and the ridges 168 of the drinking receptacle 106 are designed to hold the storage tank 108 within the second section 116 of the drinking receptacle 106. The lips 166 of the storage tank 108 snap under the ridges 168 of the drinking receptacle 106. By the term "snap under," it is meant that when a downward force is applied to the storage tank 108, pushing it downward into the second section 116 of the drinking receptacle 106, the lips 166 of the storage tank 108 lock in place under the ridges 168 of the drinking receptacle 106. This holds the storage tank 108 within the second section 116 of the drinking receptacle 106. The lips 166 and the ridges 168 provide sufficient resistance against each other to hold the storage tank 108 within the second section 116 of the drinking receptacle 106. The lips 166 and the ridges 168 are also flexible enough to allow the storage tank 108 to be removed from the second section 116 of the drinking receptacle 106 when sufficient force is exerted to pull the storage tank 108 away from the drinking receptacle 106.

Referring back to FIG. 1, to use the animal watering system 100, the user places the orifice cap 162 over the orifice 160. The user fills the storage tank 108 with water, or some other liquid, through the mouth 142 of the tank 108. A hose or standard faucet can be used to fill the storage tank 108. When the storage tank 108 is filled, the user places the first ring 146 over the top 141 of the storage tank 108. The user places the second ring 147 within the first ring 146 and over the top 141 of the storage tank 108. The user screws the cap 110 onto the top 141 of the storage tank 108 by engaging the female threads of the cap 110 with the male threads of the tank 108. As the cap is tightened 110 against the second ring 147, the second ring 147 pushes downward on the pliable first ring 146, compressing it and creating an air-tight seal around the top 141 of the storage tank 108. As the cap 110 is screwed, the second ring 147 absorbs the frictional forces, associated with screwing, thus saving the first ring 146 from wearing out and increasing the useful life of the first ring 146.

The user then places the storage tank 108 within the second section 116 of the drinking receptacle 106, orientating the orifice 160 such that is falls within the gap 128 between the first and second sections 114, 116 of the drinking receptacle 106 as shown in FIG. 2. The user then removes the orifice cap 162 from the orifice 160, allowing the water to flow from the storage tank 108 into the first section 114 of the drinking receptacle 106. The user screws the orifice cap 162 onto the stub 164 for storage. Water flows from the storage tank 108 into the first section 114 of the drinking receptacle 106 until the water in the first section 114 completely covers the orifice 160, forming a water seal. At this point, the water will stop flowing from the storage tank 108 to the first section 114. The water seal and the air-tight seal in the top 141 of the storage tank 108 create a vacuum within the storage tank 108 above the water line in the tank 108. This combined with the atmospheric pressure exerted on the water in the first section 114 of the drinking receptacle 106 prevents the water from flowing in accordance with standard barometric principles. When the water level in the first section 114 decreases to the point where air can enter the storage tank 108 through the orifice 160, air will enter the tank 108 and allow the water to flow to the first section 114 until the orifice 160 is completely covered with water.

The animal drinks the water from the first section 114 of the drinking receptacle 106. As the water level decreases in the first section 114 of the drinking receptacle 106 (below the orifice 160), air enters the storage tank 108 and water flows from the storage tank 108 into the first section 114 of the drinking receptacle 106. Thus, the storage tank 108 continuously supplies water to the first section 114 of the drinking receptacle 106. When the storage tank 108 and the first section 114 of the drinking receptacle 106 are empty, the user removes the orifice cap 162 from the stub 164 and places the orifice cap 162 over the orifice 160, sealing the orifice 160. The user then unscrews the cap 110 from the top 141 of the storage tank 108 and refills the tank 108 with water, repeating the process. The storage tank 108 can either be filled with water while still held within the second section 116 of the drinking receptacle 106 or can be removed from the drinking receptacle 106 before filling.

To move or transport the animal watering system 100, the user places the orifice cap 162 over the orifice 160. This prevents the water from flowing from the storage tank 108. The user then empties the drinking receptacle 106 of water and is ready to transport the animal watering system 100. In this manner, the animal watering system 100 can be transported with the storage tank 108 full of water and without the water leaking out. Often it is advantageous to transport the storage tank 108 full of water. For example, when animals are traveling, it is often advantageous to bring along water that the animal is used to drinking in order to reduce the chance the animal may get sick.

Figure 4:
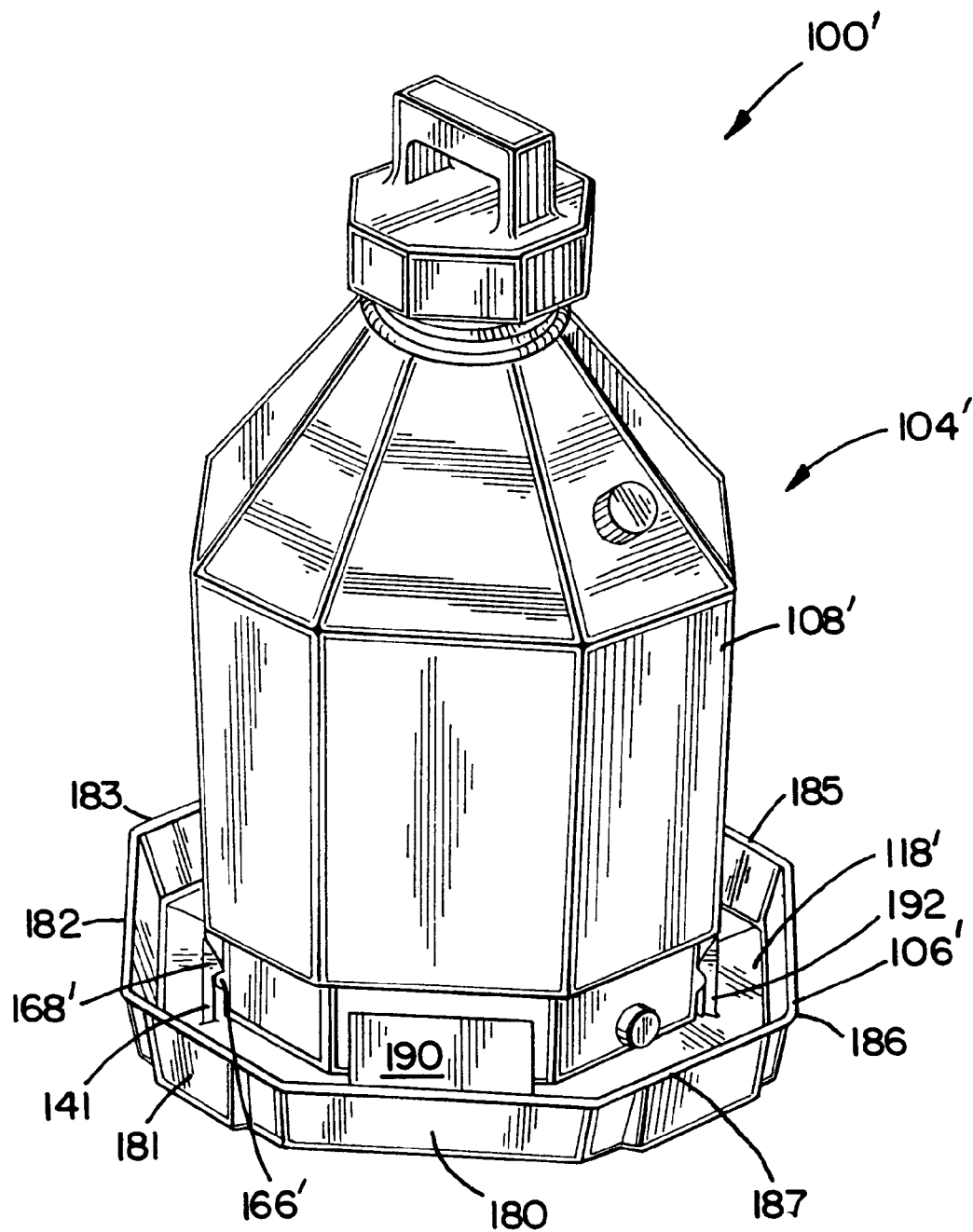
FIG. 4 is a perspective view of an assembled animal watering system, according to another example embodiment of the present invention.

Attention is directed to FIG. 4. FIG. 4 is a perspective view of an animal watering system 100' according to another example embodiment of the present invention. The particular embodiment shown in the drawings is preferred because of its distinctive, eye-catching, attractive appearance. The storage device 104' has structure analogous to the storage device 104 of FIG. 1.

The drinking receptacle 106' is designed such that the drinking area, the area that dispenses water to the animal, is accessible by more than one animal at a time, such as poultry. While a variety of designs are available, the drinking receptacle 106' illustrated in FIG. 4, allows access to animals around its entire outer circumference.

The drinking receptacle 106' is designed to receive the storage device 104'. In the embodiment illustrated in FIG. 4, the drinking receptacle 106' has a bottom 118' and a plurality of sides. Preferably, the drinking receptacle 106' has a first side 180, a second side 181, a third side 182, a fourth side 183, a fifth side (not shown), a sixth side 185, a seventh side 186, and an eighth side 187, forming a generally octagonal shape. The octagonal shape of the storage tank 108 fits within the octagonal shape of the drinking receptacle 106'.

The drinking receptacle 106' also has a plurality of free-standing walls. Preferably, the receptacle 106' has a first wall 190, a second wall 191, a third wall (not shown), and a fourth wall 192. The first wall 190, second wall 191, third wall, and fourth wall 192 have ridges 168' analogous to the ridges 168 of the drinking receptacle 106 of FIG. 1.

The lips 166' of the storage tank 108' and the ridges 168' of the drinking receptacle 106' are designed to hold the storage tank 108' within the drinking receptacle 106'. The lips 166' of the storage tank 108' snap under the ridges 168' of the drinking receptacle 106'. The lips 166' and the ridges 168' provide sufficient resistance against each other to hold the storage tank 108' within the drinking receptacle 106'. The lips 166' and the ridges 168' are also flexible enough to allow the storage tank 108' to be removed from within the drinking receptacle 106' when sufficient force is exerted to pull the storage tank 108' away from the drinking receptacle 106'.

The above specification and examples are believed to provide a complete description of the manufacture and use of particular embodiments of the invention. Many embodiments of the invention can be made without departing from the spirit and scope of the invention.

We claim:

1. An animal watering system comprising:
   (a) a storage device having a bottom, a top, a mouth located within the top and a plurality of sides, including:
      (i) a selectively openable and closable port system;
      (ii) a sealing mechanism for sealing the mouth of the storage device; and
   (b) a drinking device arranged and configured to dispense a liquid and to receive the bottom of the storage device, wherein the port system includes an orifice in one of the plurality of sides: and a first cap for closing the orifice, and
   wherein the storage device further includes a storage mechanism for storing the first cap.

2. An animal watering system according to claim 1, wherein the storage mechanism includes a stub.

3. An animal watering system according to claim 2, wherein the orifice has integral male threads around the outside circumference of the orifice, and the first cap has integral female threads around the inside circumference of the first cap, the female threads of the first cap arranged and configured to engage with the male threads of the orifice.

4. An animal watering system according to claim 3, wherein the stub has integral male threads around the outside circumference of the stub, the female threads of the first cap arranged and configured to engage with the male threads of the stub.

5. An animal watering system according to claim 4, further comprising a selectively interlocking system for securing the storage device within the drinking device.

6. An animal watering system according to claim 5, wherein the selectively interlocking system includes a plurality of lips located on the storage device, and a plurality of ridges located on the drinking device; the plurality ridges arranged and configured to engage with the plurality of lips to secure the storage device within the drinking device.

7. An animal watering system according to claim 6, wherein the sealing mechanism includes a second cap, a first ring, and a second ring; the first ring arranged and configured to provide an air-tight seal around the top of the storage device.

8. An animal watering system according to claim 7, wherein the top of the storage device has integral male threads around the outside circumference of the top, and the second cap has integral female threads around the inside circumference of the second cap, the female threads of the second cap arranged and configured to engage with the male threads of the top of the storage device.

9. An animal watering system according to claim 8, wherein the second cap has an integral handle to facilitate opening and closing the top of the storage device and to transport the animal watering system.

10. An animal watering system according to claim 9, wherein the second ring is arranged and configured to absorb the frictional forces, associated with engaging the female threads of the second cap with the male threads of the top of the storage device, to increase the useful life of the first ring.

11. An animal watering system according to claim 10, wherein the storage device has an octagonal shape, and the drinking device has an octagonal shape arranged and configured to receive the bottom of the storage device.

12. An animal watering system according to claim 11, wherein the drinking device has a first and a second section;
   (a) the first section arranged and configured to dispense a liquid to an animal;

(b) the second section arranged and configured to receive the bottom of the storage device;

(c) the first and second section arranged and configured to be in liquid-flow communication.

13. An animal watering system according to claim 10, wherein the drinking device has first, second, third, and fourth free-standing walls arranged and configured to receive the bottom of the storage device.

14. A method of using an animal watering system having a storage device and a drinking device comprising steps of:

(a) placing a first cap on an orifice in the storage device;

(b) filling the storage device with a liquid through a top of the storage device;

(c) sealing the top of the storage device;

(d) placing the storage device within the drinking device; and (e) removing the first cap from the orifice.

15. A method of using an animal watering system according to claim 14, further comprising a step of:

(a) placing the first cap on a stub for storing the first cap located on the storage device.

16. A method of using an animal watering system according to claim 15, further comprising steps of:

(a) removing the first cap from the stub;

(b) placing the first cap on the orifice; and (c) after the step of placing the first cap, transporting the animal watering system.

17. A method of using an animal watering system according to claim 14, wherein the step of sealing the top of the storage device includes:

(a) placing a first ring over the top of the storage device;

(b) placing a second ring over and within the first ring;

(c) screwing a second cap over the first and second ring and onto the top of the storage device.

18. Portable animal watering apparatus comprising:

(a) a separately transportable storage tank having a generally flat bottom wall, side walls and an open top, a cap for said open top, said cap having an integral handle, and an air-tight sealing mechanism for removeably securing said cap to said open top;

(b) a drinking receptacle having a generally flat bottom wall and a peripheral side wall with an upper edge;

(c) said receptacle and tank being configured and arranged for removeably securing said tank in said receptacle with said bottom of said tank seated on said receptacle bottom;

(d) said receptacle having a drink dispensing section disposed adjacent said tank with said tank secured in said receptacle, and said tank having an orifice in a side wall thereof positioned below said upper edge to dispense water into said drink dispensing section; and (e) a removable cap for closing said orifice to transport said tank.

19. Portable animal watering apparatus, comprising:

(a) a separately transportable storage tank having a generally flat bottom wall, a plurality of side walls and an open top, a removable cap for said open top, said cap having an integral handle, and an air-tight sealing mechanism for securing said cap to said open top;

(b) a receptacle having a generally flat bottom wall and a peripheral side wall with an upper edge, said receptacle comprising first and second adjoining sections in fluid communication with each other, on said bottom wall;

(c) said first section of said receptacle comprising a drink dispensing section and said second section holding said tank with said bottom of said tank seated on said receptacle bottom;

(d) said tank having an orifice in a side wall thereof positioned below said upper edge to dispense water into said drink dispensing section; and (e) means for closing said orifice to transport said tank.

20. Portable animal watering apparatus according to claim 19, further comprising a selectively interlocking system for securing the storage tank within the second section of said receptacle.

21. Portable animal watering apparatus according to claim 20, wherein the selectively interlocking system includes a plurality of lips located on the storage tank, and a plurality of ridges located on the receptacle, the ridges engaging with the lips to secure the storage tank within the second section of the receptacle.

22. Animal watering apparatus, comprising:

(a) a storage tank having a bottom wall, a plurality of side walls and an open top, a removable cap for said open top, said cap having an integral handle, and an air-tight sealing mechanism for securing said cap to said open top;

(b) a receptacle having a bottom wall and a peripheral side wall with an upper edge, comprising first and second adjoining sections on said bottom wall, separated by a wall with an opening therein to provide fluid communication therebetween;

(c) said first section of said receptacle comprising a drink dispensing section and said second section being configured and arranged for receiving said tank with said bottom of said tank seated on said receptacle bottom;

(d) said tank having a threaded port member in a side wall thereof positioned below said upper edge and in line with said opening with said tank received in said second section, to dispense water into said drink dispensing section through said opening; and (e) a threaded cap for closing said port member to transport said tank, and a threaded stub on said tank for holding said threaded cap when said port member is left open to dispense water.

23. Animal watering apparatus according to claim 22, wherein the storage tank side walls form an octagonal shape, and wherein the second section has a corresponding octagonal shape to receive the bottom of the storage tank.

24. Animal watering apparatus according to claim 22, wherein a plurality of lips are located on the storage tank, and a plurality of ridges are located on the receptacle so that the lips can be engaged with the ridges to secure the storage tank within the receptacle.

* * * * *